(12) United States Patent
Ramachandran et al.

(10) Patent No.: US 10,778,646 B2
(45) Date of Patent: Sep. 15, 2020

(54) GLOBALLY DEPLOYABLE CONTEXT AWARE VPN HEADENDS IN SCALE THROUGH NAMESPACES

(71) Applicant: Cisco Technology, Inc., San Jose, CA (US)

(72) Inventors: Aravinth Kumar Ramachandran, Bangalore (IN); Umanath Somi Sekaran, Bengaluru (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 131 days.

(21) Appl. No.: 15/973,404

(22) Filed: May 7, 2018

(65) Prior Publication Data

US 2019/0342266 A1   Nov. 7, 2019

(51) Int. Cl.
*H04L 29/06* (2006.01)
(52) U.S. Cl.
CPC ........ *H04L 63/0272* (2013.01); *H04L 63/029* (2013.01)
(58) Field of Classification Search
CPC .. H04L 63/0272; H04L 63/029; H04L 63/164
See application file for complete search history.

(56) References Cited

U.S. PATENT DOCUMENTS

| | | | |
|---|---|---|---|
| 7,032,242 B1 | 4/2006 | Grabelsky et al. | |
| 9,495,478 B2 | 11/2016 | Hendrickson et al. | |
| 9,769,120 B2 | 9/2017 | Fainkichen et al. | |
| 9,813,343 B2 | 11/2017 | Williams et al. | |
| 2007/0130109 A1* | 6/2007 | King | G06F 16/951 |
| 2008/0148283 A1* | 6/2008 | Allen | G06F 8/38 |
| | | | 719/316 |

(Continued)

OTHER PUBLICATIONS

International Search Report and Written Opinion from the International Searching Authority, dated Aug. 1, 2019, 13 pages, for corresponding International Patent Application No. PCT/US2019/030608.

(Continued)

*Primary Examiner* — Nelson S. Giddins
(74) *Attorney, Agent, or Firm* — Polsinelli PC

(57) ABSTRACT

The present technology is directed to a system and method for implementing scalable namespace based VPN headends with context awareness to facilitate targeted and granular provision of security services within the cloud. The scalability aspect involves the creation or allocation of one or more namespaces as direct termination points for inbound VPN connections to the cloud. The namespace are created dynamically upon discovery of context information (metadata) associated with deployment of a new customer traffic/connection onto the cloud. This information will be attached to the namespace to implement context awareness so that customer traffic may be attached into upstream services in a service-discoverable way. In this way, upon deployment, upstream services will automatically know about the new customer traffic and can implement security enforcement in an isolated fashion. The disclosed technology also involves dynamic propagation of the customer traffic metadata to other datacenters across the cloud environment.

22 Claims, 3 Drawing Sheets

(56) References Cited

U.S. PATENT DOCUMENTS

| | | | |
|---|---|---|---|
| 2015/0381596 A1* | 12/2015 | Johnson | H04L 63/0272 726/6 |
| 2016/0380916 A1* | 12/2016 | Gnaneswaran | H04L 47/803 709/224 |
| 2017/0093921 A1* | 3/2017 | Duan | H04L 63/1408 |
| 2018/0115514 A1* | 4/2018 | Chou | G06F 9/45558 |
| 2018/0063087 A1 | 5/2018 | Hira et al. | |
| 2019/0102411 A1* | 4/2019 | Hung | H04L 41/0856 |

OTHER PUBLICATIONS

Taherimonfared, Aryan, et al., "Multi-tenant Network Monitoring Based on Software Defined Networking," 2013, pp. 327-341.

* cited by examiner

GLOBALLY DEPLOYABLE CONTEXT AWARE VPN HEADENDS IN SCALE THROUGH NAMESPACES

TECHNICAL FIELD

The present technology pertains to secure data transmission in a cloud network environment. More specifically it is directed to scalable Virtual Private Network (VPN) headend deployment with upstream security enforcement capability.

BACKGROUND

In a cloud-based security platform such as the Cisco umbrella, customer data traffic is generally secured through layered defensive and offensive security techniques. The general objective is to secure traffic generated through any protocol and on any port. This approach is commonly known as 'all port, all protocol' security.

Currently, cloud-based security platforms, like the Cisco umbrella, use DNS based security measures to stop threats. Virtual appliances, such as VMware, deployed on enterprise customer network, direct internet traffic to resolvers in the cloud system. The resolvers, instead of proxying all the web traffic, will route requests to risky domains for deeper URL and file inspection. If the resolvers assess and determine that a resolved IP address belongs to a risky domain, it is blocked and the customer is instead directed to a lander page which is basically a block page. This is the level of security offered in many conventional cloud-based security platforms.

The DNS level security implementation is primarily considered an add-on security and not core level security. Other security implementations like the secure web gateway are by default configured to scan and filter requests for web access arriving on ports 80 and 443. These technologies are not adequately responsive to security concerns of some network clients who want to secure all ports and protocols branching out from their enterprise edge device. Furthermore, conventional security inspection schemes, as deployed for example, by the Cisco Umbrella, may send all the internet bound traffic to a central office/headquarter for further security inspection and subsequently backhaul the traffic from the headquarter. This may not be amenable to many clients who prefer direct cloud access, originating from their enterprise or branch office edge router and leading directly to the cloud.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
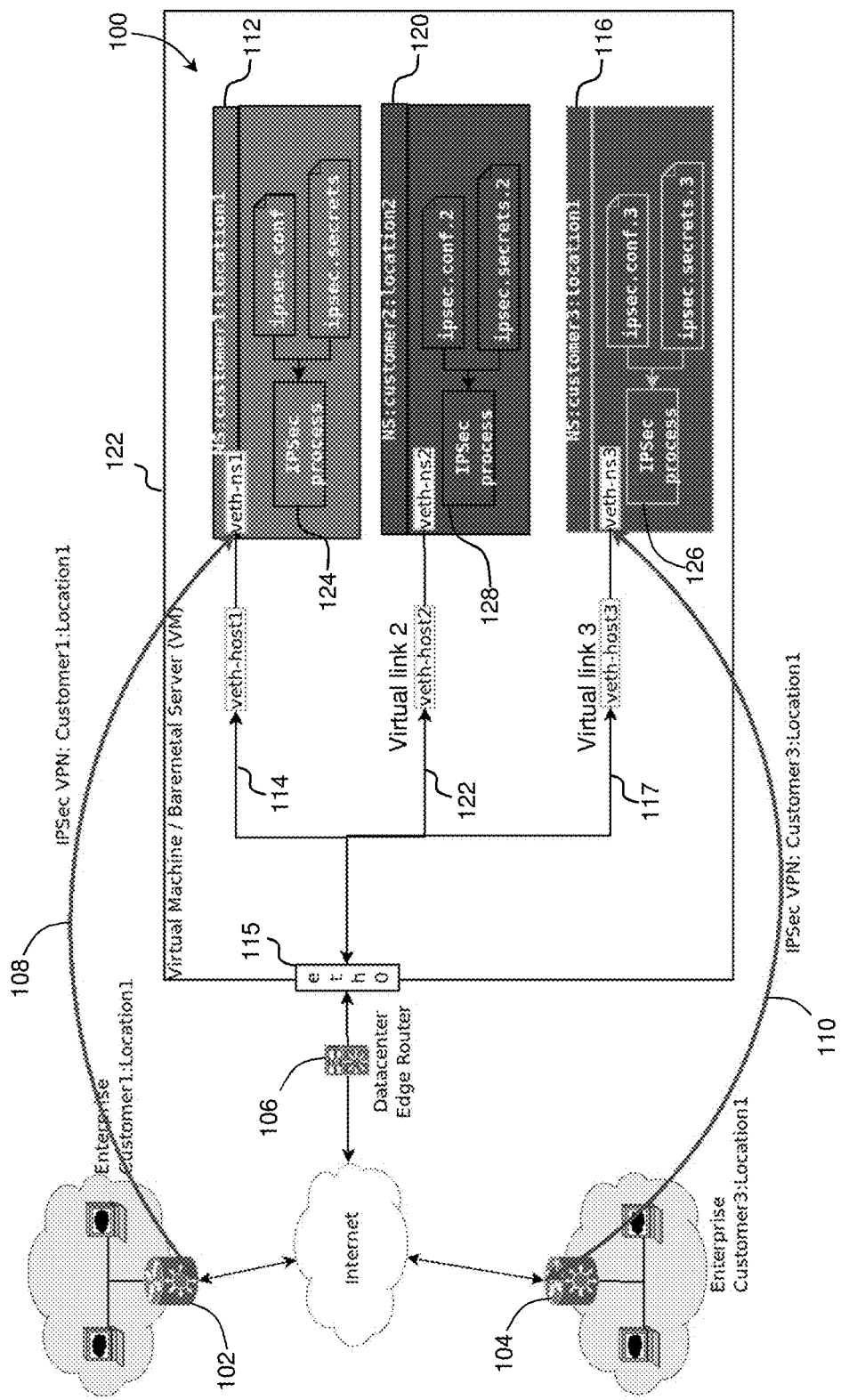
FIG. 1 illustrates an exemplary namespace (NS) based VPN Headend implementation with improved scalability and multi-tenancy, in accordance to one embodiment of the present technology.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Systems, methods, and devices are disclosed implementing scalable context-aware VPN headend with improved network flexibility. Aspects of the technology are directed to steps of attaching one or more metadata blocks associated with one or more network traffic flows to one or more network namespaces. The network namespaces may be configured on a host device in a cloud network. Subsequently one or more VPN tunnels, transporting the network traffic flows are terminated directly onto particular namespaces having the corresponding metadata attached therein. This implements context awareness and enables provision of specific upstream cloud services based on an identification made from the attached metadata block. According embodiments of the technology namespaces may be dynamically configured by the host device upon metadata associated with customer traffic is made available on the cloud environment or communicated to the headend host.

Example Embodiments

Disclosed are systems, methods, and non-transitory computer-readable storage media for scalable namespace based VPN headend deployment with customer context awareness to facilitate a granular application of security policies by the upstream cloud services. Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

One problem addressed by the present technology, is the scaling up of the number of IPsec headend instances as additional customers are on boarded. Another problem addressed by the present technology is to provide services and security policy implementations behind the IPsec gateway as appropriate to specific traffic flows (i.e., service-discovered provisioning). Available technologies do not adequately address these problems as they are either directed to application virtualization by using a container technology like Docker, or the use of heavyweight technologies like VM virtualization for scaling. Containers are similar to VMs in so far as they are a type of virtualization technology, with their own CPU, memory and resources like a virtual machine. The difference is that more light weight since they share the kernel of the host operating system and don't need a guest operating system.

One embodiment of the proposed invention makes use of Network name spaces paired with specific context information to implement VPN headends with increased capacity and scalability along with granular and targeted upstream security enforcement capability.

Linux Network Namespaces provide virtualization at the network layer, including the media access layer which provides the ability to granularly control the creation and scaling of Linux namespaces. Utilizing this property in accordance with some embodiments of the present technology provides for granular control on how one can bind a context to a specific customer but still scale it across hosts and Datacenters. In accordance with some embodiments, the aforementioned approach is utilized in conjunction with the capacity of Linux-based IPsec implementation, such as StrongSwan (complete IPsec solution providing encryption and authentication to servers and clients) to run as isolated process instances inside namespaces, to thereby provide VPN headend deployment with increased scalability and multi-tenancy in addition to service-discovered security provisioning behind the IPsec gateway in a dynamic and on-demand fashion.

For example, in a non-namespace approach, supporting a customer with presence in multiple global locations and several branch office deployments either requires especially provisioned hardware platforms or VMs, or enhancing of available hardware/VMs. Achieving this at scale and on-demand may lead to delays in provisioning and may be difficult to manage.

In accordance with some embodiments of the present technology, the above scenario maybe handled with much faster turn-around by deploying context based namespaces bundled to available Linux host, in virtualized (VM) or non-virtualized (Bare metal Server) environments in a geo-located data center and making the context discoverable to upstream services. In this way, upon deployment, the upstream services automatically learn about the new customer traffic and the retained identities at the network and the user level, and start applying the appropriate type and level of security policies. Since this bound namespace context is scalable, one has the option of deploying as many instances of this context as needed and where needed without having to modify configuration. For example, in case of a cloud-based security platform such as the Cisco umbrella cloud, the customer can have Cisco Umbrella security instantaneously in all locations with both network (branch) level and user (endpoint IP) level policy enforcement.

In some embodiments, network level and user level information associated with the new customer traffic may become available respectively through preserved network masks and endpoint IP addresses carried inside IPSec VPN.

FIG. 1 illustrates an exemplary namespace-based VPN headend configuration 100. In FIG. 1, Enterprise edge devices 102 and 104, associated with different customer networks, are connected to a datacenter edge device 106 via respective IPsec based VPN tunnels 108 and 110. IPsec based VPN tunnel 108 terminates at namespace 112, identified by a Specific Namespace Name (SNN) of customer1: location1. The connection is mapped across virtual link 114 that binds namespace 112 to physical Ethernet port 115. Similarly, IPsec based VPN tunnel 110 terminates at namespace 116, identified by an SNN of customer3:location1. The connection is mapped across virtual link 117 that binds namespace 116 to physical Ethernet port 115. An additional namespace 120 with a SNN of customer2:location2 is configured and bound, via virtual link 122 to the physical Ethernet port 115 on the host device, namely datacenter edge router 106. However, namespace 120 is not used to terminate a Network client VPN connection. The namespaces 112, 116 and 120 are deployed in a Virtual Machine/Baremetal server 122.

In the exemplary embodiment of FIG. 1, IPsec provider software, namely StrongSwan, is installed at the host layer. A useful feature of IPsec processes is that they may be spun out for individual namespaces. Therefore, as shown in FIG. 1, an instance of IPsec process is executed on demand inside each namespace. This is indicated in the configuration 100 by IPsec process 124, 126 and 128 running isolated inside namespace 112, 116 and 120 respectively. The corresponding configurations, namely ipsec.conf and ipsec.secrets along with the relevant cert folders are all maintained in the host's file system without having to maintain a separate entity. This results in system that is simple and easily scalable.

Each namespace based headend termination point is associated with a particular customer traffic.

Namespaces virtualize all access to network resources, such as interfaces, port numbers, etc. Thus customer initiated IPsec VPN connection, terminating at a corresponding namespace, is only granted the network access it needs. In this way different customer traffic flows associated with different corresponding namespaces are transparent to each other (not able to see each other's packet streams). Therefore they are able to bind to the same physical port without interfering with each other. This is illustrated in the exemplary embodiment of FIG. 1 as Namespaces 112, 116 and 120 (associated with different customer networks) are all bound to a common physical port, namely Ethernet port 115. Therefore, one aspect of the present technology is directed to a system and method for providing secure and scalable cloud access for customer's traffic originating from a particular customer location, which involves creating or allocating one or more namespaces to terminate a client's VPN connection to the cloud, with an unconventional feature of attaching the customer VPN tunnel directly into the namespace.

Network interfaces made up of real hardware are normally assigned to the root or the host system namespace. Communication between the host namespace and other namespaces is made possible, for example, by way of a "virtual Ethernet" device as indicated by veth-host1, veth-host2 and veth-host3 in FIG. 1. A virtual device can be thought of as a pipe into the restricted namespace; so by default when a virtual device is created one end of the pipe becomes attached to the host system namespace and the other end to the created/deployed network namespace. Therefore, packets written to one end will show up at the other. Furthermore, since each namespace is uniquely identified with a reachable IP address, with the addition of a few routing rules in the root namespace, packets meeting the right criteria can be directed into and out of specific namespaces. Thus, in reference to FIG. 1, customer endpoints (gateway devices) 102 and 104 are able to establish respective IPsec connections 108 and 110, directly into corresponding namespaces 112 and 116.

According to one embodiment of the present technology, for each new customer connection on-boarded onto a cloud network a new namespace is dynamically created from the corresponding customer-specific metadata (context). Therefore anytime a customer IPsec-based VPN tunnel terminates onto a corresponding context-based namespace, the namespace will have all of the information that would normally be stripped out by the VPN tunnel.

Exemplary embodiments as shown in FIG. 1 and described above illustrates how multi-tenancy and up-scaling in VPN headend deployment may be achieved by using Linux network namespaces in conjunction with a Linux-based IPsec implementation, such as StrongSwan. According to one embodiment, usage of a barebones network namespace and a minimal script to create the same in an automated fashion in an open source modern Linux Distribution, enables the number of namespaces to be scaled to a much higher number in a single VM.

Figure 2:
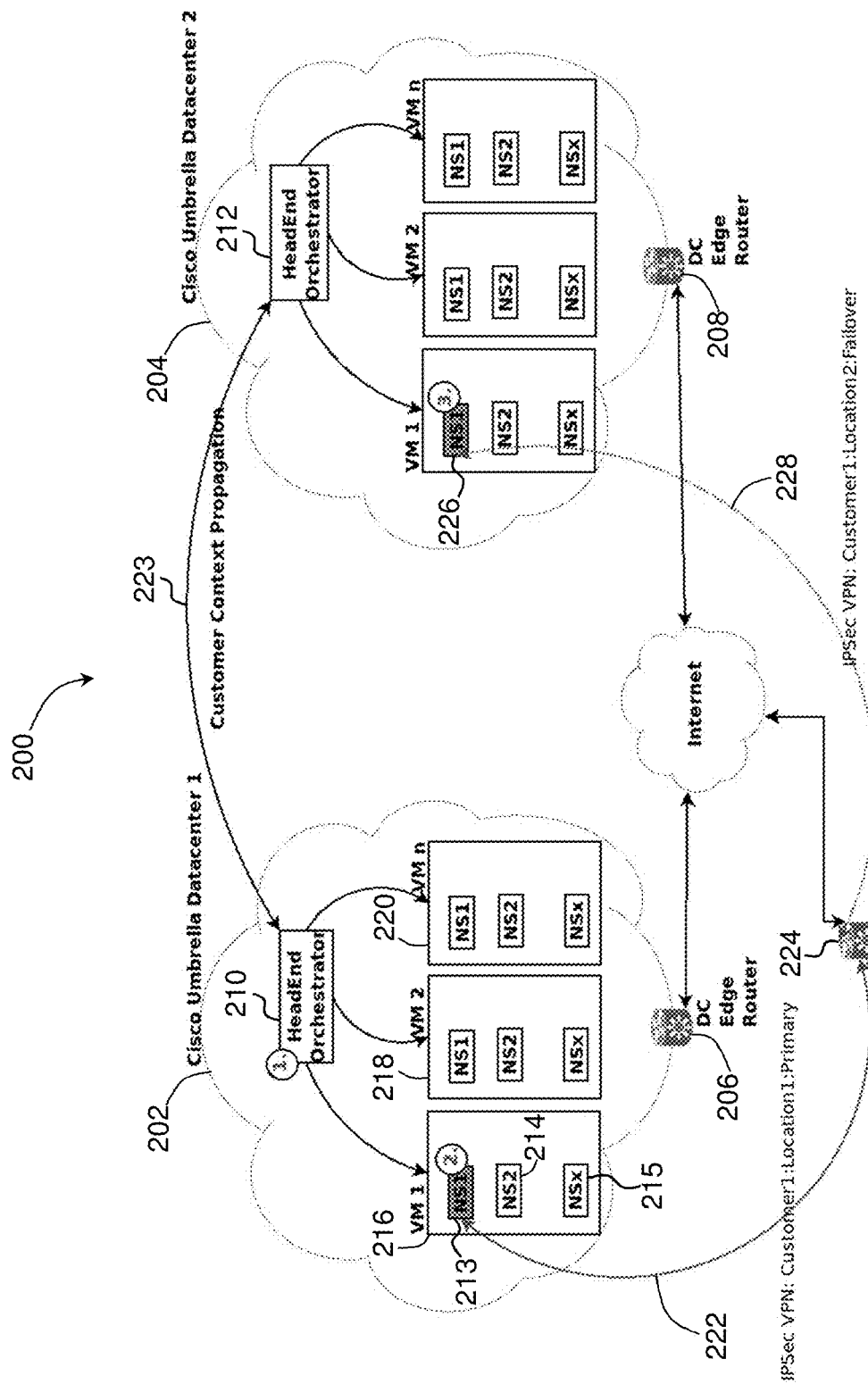
FIG. 2 illustrates the vertical and horizontal scaling of namespaces along with dynamic creation and global propagation of customer context information attached thereto across a cloud network environment, in accordance to one embodiment of the present technology.

In accordance to one embodiment, as the Network Namespace instances containing the IPSec processes reach capacity in a single VM, further scaling may be achieved through horizontally scaling the number of VMs on the host device, as shown in FIG. 2.

One aspect of the technology involves the dynamic creation of a namespace per customer, while another aspect may be directed to global distribution of customer specific information (Context) used to create the aforementioned namespace, to for example, various datacenters. In this way when a second office branch associated with the same customer attempts to attach elsewhere to the cloud, for example from a different region across the globe, the context information would already be available, and the namespace deployment and IPsec tunnel creation in that region becomes automatic.

The context information generally consists of customer metadata such branch and gateway information including IP addresses, as well as information with regards to known customer endpoints from which an IPSec VPN connection requests into the cloud network may be received. Additionally, the context also contains the Specific Network Namespace (SNN) dynamically created for each customer connection (typically of the form NS:CustomerName:Location). At a minimum, a context might have one egress facing IPSec VPN endpoint and one upstream facing VPN/Non-VPN Connectivity capability.

One embodiment involves collecting customer context information on the front end from configuration data such as VPN IP address, or initiate Key, etc., that may be stored on a customer's gateway equipment and then dynamically provisioning namespace(s) according to those configurations in the backend.

Once a template based on customer information (such as Gateway IP, Authentication mechanism etc.) is created, the template will be bound to a customer context. This context will then be used to provide VPN services to Customer Enterprises across the globe. According to one embodiment, this may be accomplished using an orchestration mechanism. The headend component that provides orchestration functionality may be referred to as headend orchestrator. The headend orchestrator will collect identifying information about a customer through any available means. The collected information is bundled into a customer context that will be attached to a corresponding namespace. The context-based namespace is then used as a termination point for the particular customer's cloud-access VPN connection.

As previously indicated, in addition to the dynamic creation of per customer namespaces from customer specific information (Context), and scaling up VPN headend deployment using the namespaces comprising of specific customer context information, some embodiments of the present technology are further directed to global distribution of customer context information (attached to the aforementioned namespace) across a portion of, or the entirety of, the cloud network environment or to various cloud environments (for example to various datacenters that may or may not be cloud based). The Context propagation feature, as disclosed by select embodiments, enables rapid global provisioning/deployment of cloud-access VPN connections and furthermore provides automatic global redundancy for cloud-access VPN connections throughout the entire cloud network environment.

FIG. 2 illustrates an exemplary cloud network environment 200 (i.e., Cisco Umbrella cloud environment) featuring namespace based VPN headend implementation and global/cloud-wide context propagation functionality. The exemplary cloud environment 200 includes a cloud datacenters (DC) 202 and 204. Network connectivity between cloud datacenter 202 and cloud datacenter 204 is established across a pair of datacenter edge routers, namely edge router 206 (connected to datacenter 202) and edge router 208 (connected to datacenter 204). A headend orchestrator (HEO) 210 and a headend orchestrator (HEO) 212 are respectively deployed in datacenter 202 and 204. A headend orchestrator (HEO) is customized network orchestration software for deploying namespaces with corresponding specific customer context and moreover, propagating customer context across all datacenters (i.e., Cisco Umbrella Datacenters) within the cloud network environment.

The namespace instances created by the headend orchestrator 210 resident in datacenter 202 each correspond to a specific customer context which, for example, identifies particular client network traffic or VPN tunnel originating from a client remote or co-located device and terminating into a corresponding namespace configured/deployed on the VPN headend device in datacenter 202. As previously described, these bound namespace contexts are scalable. As such, referring to FIG. 2, namespace instances 213 and 214, created by headend orchestrator 210 (running on the VPN headend device in datacenter 202) are vertically scaled up, within VM instance 216, all the way to and including an $n^{th}$ namespace 215.

The number of namespace instances is multiplied every time a new VM instance is launched by the VPN headend host, as illustrated, with reference to FIG. 2, by deployment of VM 218 and 220 by headend orchestrator 210. Thus demonstrating an aspect of the present technology as directed to the vertical scaling of namespace per VM that may further be augmented by an additional horizontal scaling across multiple VMs.

Therefore, in accordance to one aspect of the present technology, by attaching specific customer context information to a corresponding namespace, and further by configuring that namespace as a headend termination point for the specific customer's cloud-bound network traffic or VPN connection, context-aware namespace based VPN headends may be implemented that scale incredibly fast in order to support a rapidly expanding customer base, while being multi-tenant capable.

Another aspect of the present technology, as previously described and further illustrated in FIG. 2, involves the global (cloud-wide or across multiple clouds) propagation of customer context from one datacenter host (where the corresponding context information was initially learned/discovered) to one or more datacenters across the cloud network. According to another embodiment, context information may be propagated to all datacenters across the entire cloud network. According to yet another embodiment, context information may further be propagated to datacenters located on other cloud networks that may be relevant from the perspective of the provider and/or the client.

In the example cloud network environment 200 of FIG. 2, customer context information corresponding to various distinct namespace instances created by headend orchestrator 210 and stored on a VPN headend host at datacenter 202 are communicated to headend orchestrator 212 at datacenter 204 which is located at another region in the distributed cloud environment. Upon receiving the context information, headend orchestrator 212 will deploy the corresponding namespace instances for each respective customer context thus automatically creating a context-based namespace record redundancy within the cloud. Consequently, IPSec headend redundancy and rapid provisioning capability is established across a portion or the entirety of the distributed cloud environment.

Referring back to FIG. 2 to further illustrate the described performance enhancement, namespace instance 213, located on a host in datacenter 202, is deployed by headend orchestrator 210 from acquired context information associated with the enterprise customer 214. Once context-based namespace 213 is deployed on host machine in datacenter 202, it is dynamically configured/provisioned as the primary termination point for the inbound IPsec VPN tunnel 222 originating from Enterprise Customer edge router 224 and terminating at namespace 213 on VM 216 located at datacenter 202. Therefore, through the operation of headend orchestrator 210, Enterprise customer 214 automatically establishes an IPsec VPN tunnel 222 to the datacenter 202.

Namespace 213, serving as the headend termination point of VPN tunnel 222, is associated with a dynamically configured Specific Namespace name (SNN) that identifies the customer initiating the IPsec VPN tunnel 222 to the cloud as well as the termination point of the IPsec VPN tunnel 222 on the edge of cloud. In the example shown in FIG. 2, the respective Enterprise Customer is identified as Customer 1 and the datacenter 210 where customer IPsec VPN tunnel 222 is terminated is identified as Location 1. Therefore the Enterprise customer's primary IPsec VPN tunnel 222 to the cloud network terminates at a namespace with SNN of Customer1:Location1.

Since customer context information once acquired by a headend orchestrator will be communicated across the cloud environment to datacenters at other regions of the cloud, headend orchestrator 212 located at datacenter 204 will have learned about the Enterprise Customer 214 (through propagation of the associated context information from headend orchestrator 210 as indicated by 223 in FIG. 2) and dynamically create or deploy namespace 226 with the corresponding context information associated with Enterprise Customer 214, thus creating a failover cloud connection (IPSec tunnel) for the enterprise customer 214 through datacenter 204.

As discussed above, namespace instance 226, located on a VPN headend host in datacenter 220, is deployed by headend orchestrator 212 from the context information associated with the enterprise customer 214 that was propagated by headend orchestrator 210. Once context-based namespace 226 is deployed on host machine in datacenter 204, it is dynamically configured/provisioned as a secondary cloud termination point for Enterprise Customer 214, which is denoted as failover IPsec VPN tunnel 228 in FIG. 2.

IPsec VPN tunnel 228 terminates into namespace 226 which is dynamically configured with a Specific Namespace name (SNN) name that identifies the customer establishing the IPsec VPN connection to the cloud and also the termination point of the customer IPsec VPN connection on the edge of cloud. The IPsec VPN tunnel 228 is originated from the same edge router 224 belonging to the same Enterprise Customer identified as Customer 1. However, the termination point of the IPsec VPN tunnel 228 is located at another region, namely datacenter 204 and is therefore identified as Location 2, in the example illustrated in FIG. 2. Therefore the Enterprise customer's secondary (failover) IPsec VPN tunnel 228 to the cloud network terminates at a namespace with SNN of Customer1:Location2.

As such a secondary IPsec VPN tunnel originating from Enterprise customer 214 may now be established to the cloud network at datacenter 204. Thus secondary VPN connection to the cloud may serve as a failover backup cloud connection providing cloud connectivity redundancy for Enterprise Customer 214. Therefore the IPsec VPN tunnels 222 and 228 belonging to the same enterprise customer 214 are distinguished based on the corresponding location of the terminating datacenter, as expressed by their dynamically configured SNN.

As described above, global propagation of learned context information (among datacenters located at different regions in the cloud) is achieved by enabling headend orchestrators at different regions of the cloud to communicate with one another (for example, through establishing of a peer to peer connection to exchange information). One advantage of this disclosed feature of the technology is the resulting path redundancy implementation for the inbound client IPsec VPN connection to the cloud, which provides one or more failover paths available for client VPN cloud access.

Another advantage resulting from disclosed embodiments of the technology is the rapid deployment/provisioning of VPN headends. For example, in referencing FIG. 2, consider an event whereby the Enterprise customer 214 deploys additional branch offices located at different regions, such as within regional coverage of datacenter 204 or other datacenters located elsewhere on the cloud network. In such a case, having the headend namespace configuration and context information already in place at various datacenters across the cloud (due to context information propagation) would enable the traffic from the new branches to be deployed onto the cloud more rapidly. Thus highly scalable and secure branch connectivity to the cloud becomes easily available and rapidly deployable anywhere across the entire cloud network environment. This would correspond to having Ubiquitous Cloud entry points whereby dynamic VPN tunnel deployment is immediately available from any region throughout the cloud network environment.

As discussed above with respect to one embodiment of the technology, each namespace is dynamically created and configured by the headend orchestrator utilizing context information that uniquely identifies a cloud-bound customer traffic/connection. An IPsec based VPN tunnel transporting cloud-bound customer data traffic characterized by specific contextual information, will be terminated at a namespace to which the same contextual information is attached. Degree of granularity with which namespace may be deployed reflects the degree of granularity with which the identification can be made so as to distinguish the traffic at various hierarchical levels (i.e., end user level, enterprise level and/or branch level).

Therefore, as per one aspect of the technology, each distinct namespace maybe created by a headend orchestrator from received or discovered context information associated with a distinct client network/data traffic, wherein the context information is subsequently propagated by the headend orchestrator across the cloud environment to other headend orchestrators to thereby enable rapid scale up of VPN headend deployment, provide full redundancy for customer VPN connections to the cloud network environment, as well as achieve flexibility and rapid provisioning across a cloud network environment, such as the Cisco Umbrella cloud.

Therefore, according to one embodiment of the technology, the headend orchestrator plays a central role in ensuring a customer on-boarded in one region is known by cloud datacenters in other regions.

According to one aspect of the technology, the namespaces as well as the Specific Namespace names (SNN) are dynamically configured using an orchestration mechanism. As a result, anytime a customer is on-boarded outside of this system, the headend VPN device, via its headend orchestrator software, will learn about the customer and dynamically provisions a corresponding namespace and make it ready for the customer. The customer context information that a dynamically provisioned namespace is created from may be made available with required software and services in the cloud as needed. The Context will be made service discoverable (discoverable to upstream services) inside cloud network environment, such as the Umbrella Cloud, via headend orchestrator In accordance to an aspect of the invention VPN headends are considered deployable entities with custom configuration that is dynamically applied and propagated across the cloud to support specific customer organizations. Orchestration mechanisms maybe utilized, by select embodiment of the technology, to generate namespaces, provision VPN headends and manage their lifecycle.

In one embodiment, a customized Container Orchestration mechanism such as the Docker Swarm or Kubernetes or Network Virtualization manager such as OpenStack may be utilized for the purpose of namespace orchestration. The Orchestration system, according to this embodiment, may be customized to provision namespaces instead of only Containers as is the convention. In disclosed embodiments as described above and illustrated in FIG. 2, a Headend Orchestrator (i.e., entity 210 and 212 in FIG. 2) may be used to implement the orchestrations mechanism.

Figure 3:
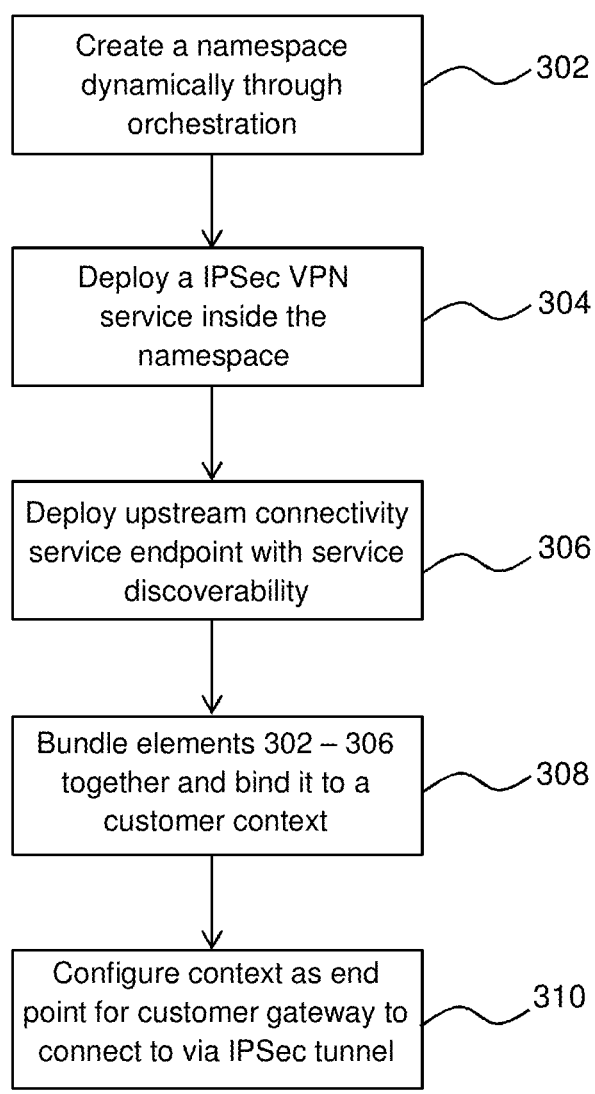
FIG. 3 illustrates a basic operational flow for provisioning namespace-based VPN headends capable of attaching into upstream services in a service-discoverable fashion, in accordance to one embodiment of the present technology.

A simple operational flow diagram 300 in FIG. 3 illustrates the basic steps involved in provisioning of scalable namespace based VPN headends with context awareness such as to enable targeted and granular provision of security services within the cloud, in accordance to one embodiment of the technology. At 302, namespace is created dynamically upon discovery of context information associated with a new customer traffic/connection that will be or has been deployed onto the cloud. This step may be facilitated by an orchestration process implemented by one or more headend orchestrators (denoted, for example, by elements 210 and 212 in the exemplary cloud based network environment 200).

In accordance with an aspect of the technology customer existence/information becomes discoverable by a headend orchestrator as soon as it is made available on the cloud.

According to one embodiment, the amount of context information (associated with a new customer connection or traffic) required to trigger a headend orchestrator to dynamically create a namespace based on that context information is the name of the customer (identifier forming the first half of the specific SNN designation for that customer), the gateway IP address from which the customer enterprise network will initiate IPsec tunnel and, in some embodiments, location information. According to one embodiment, a fully qualified domain name (FQDN) may be used with or instead of IP address information as context information. Once the headend orchestrator learns or discovers the required context information, it will dynamically create a namespace with a SNN designation consisting of a customer identifier concatenated with location of the client VPN tunnel termination on the edge of the cloud (or the datacenter location corresponding to customer traffic entry point into the cloud) as illustrated for namespace 112, 116 and 120 in FIG. 1 and namespace 213 and 226 in FIG. 2.

Referring back to FIG. 3, the dynamically created namespace (with attached context information) in 302 is provided with an egress facing IPSec VPN endpoint at 304 by deploying an IPsec VPN service inside the namespace. The context-based namespace will now be able to serve as a termination point for an inbound client IPSec VPN connection to the cloud, once it has been appropriately mapped and routed to the outside world. This is illustrated in FIG. 1 by IPSec process instant 112 and 128 running in isolation inside namespace 112 and 116, respectively, and terminating client VPN connection 108 and 110.

Referring back to FIG. 3, at step 306, the IPSec enabled namespace (with attached context) from 304 is provided with an upstream facing connectivity and service discovery capability through deployment of an upstream connectivity service endpoint which is made service discoverable for upstream services. In this way the context, containing a customer/network information template (i.e., customer name/identifier, Gateway IP, authentication mechanism, etc.) could be made available with required software and services as needed. The context information, self-contained in a corresponding namespace, is thus rendered discoverable to upstream cloud service. This will enable targeted enforcement of security policies by upstream services and enable the operation of upstream services to be isolated according to different traffic types and/or at various hierarchical levels (user level, network level).

Finally, any remaining configuration elements from operational steps 302 to 306 are bundled together and bound to the customer context at 308. The customer context created in 308 is provisioned as the endpoint for a client gateway VPN connection to the cloud at step 310.

In one embodiment, the context is made service discoverable inside a cloud network environment, such as the Umbrella cloud, via a headend orchestrator In one embodiment, one or more headend orchestrators will be made available in all of the known regions (i.e., the datacenters) and made capable of communicating with each other and synchronizing information with respect to all the customers they are aware of. As a result, once a namespace record is created by an headend orchestrator in one region, for consistency purposes, this information is published to other headend orchestrators in other regions and once other headend orchestrator learn about the existence of the customer they will start creating NS in other regions as well According to one embodiment, information corresponding to a specific customer context (metadata block) may be propagated by or pulled from one or more databases, such as an accounting database, to which the relevant information may trickle down. One method to make sure the information is propagated and received by the headend orchestrator may involve provisioning an API endpoint from an accounts database and have a headend orchestrator listen in to the API or poll into the API. So at any given poll if the headend orchestrator becomes aware of a new customer it can proceed to provision a corresponding namespace.

Another way by which context information may be retrieved, collected or acquired by a headend orchestrator would be to have a subscription based mechanism that the headend orchestrator listens to for any subscriber who can communicate with the headend orchestrator. The subscriber, on the opposite end of the communication could be any entity, such as the account database for example, or any other tool or an API end point. Once the entity learns about the customer existence all it needs to do is to publish the information into the Headend orchestrator (headend orchestrator).

In accordance with one embodiment of the technology, an open source IPSec provider, such as StrongSwan is used as IPSec provider at the Headend host in order to maintain the highest degree of interoperability with most customer gateway devices that support standard IPSec implementation. In another embodiment, StrongS wan may be used to start the service with but later may be seamlessly replaced with an alternative VPN service.

In yet another embodiment, wherein an overall design is based on commodity Linux architecture, any IPsec provider capable of being installed on a Linux based VM may be utilized instead of StrongSwan. This flexibility along with the capability of running processes completely isolated inside a Network Namespace enables system and methods associated with embodiment of the technology to support even customer gateway devices which may be supported by only a specific IPSec provider.

Although several embodiments of the technology are directed to systems and methods that solely utilize Network Namespaces to satisfy all required criteria thereby simplifying the complete design by obviating a need to have a container technology in place. Other embodiments may be directed to the use of containers on top of Network Namespaces, to thereby provide the capability of adding supplementary software which might be needed to support some aspects the system.

Different embodiment of the disclosed technology describe features and functions that enables interoperability with any customer gateway, while providing proactive support for customer cloud access and transport needs by implementing automatic failover mechanism and rapid global/multisite provisioning of customer traffic. Additional features enable by embodiments of the technology such as rapid scaling of VPN headend, flexible interchange of the VPN service itself depending on requirements and orchestrated capacity planning to readily expand customer base, among others features, benefits and advantages have also been enabled by inventive features disclosed in the context of various embodiments and examples of the present technology.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computer-readable medium comprising computer executable instructions stored thereon, the instructions when executed are effective to cause one or more processors to:

associate one or more metadata blocks corresponding to one or more network traffic flows with one or more network namespaces configured on a host device in a cloud network, such that the one or more network traffic flows are identifiable by the one or more metadata blocks associated with the one or more network namespaces, the one or more network traffic flows being transported through a corresponding one of one or more VPN tunnels;

terminate each one of the one or more VPN tunnels at a corresponding one of the one or more network namespaces and direct a corresponding one of the one or more network traffic flows through the corresponding one of the one or more network namespaces;

provide specific upstream cloud services relevant to each of the one or more data traffic flows based on an identification based on the one or more metadata blocks corresponding to the one or more network traffic flows and associated with the one or more network namespaces; and identify one or more policies to be applied by the upstream cloud services to the one or more network traffic flows, the one or more policies being associated with the one or more network namespaces.

2. The non-transitory computer-readable medium of claim 1, wherein the one or more network namespaces are dynamically configured by the host device upon the one or more metadata blocks being made available to the host device.

3. The non-transitory computer-readable medium of claim 2, wherein the one or more metadata blocks are made available to the host device by one or more databases on the cloud network configured to communicate with the host device.

4. The non-transitory computer-readable medium of claim 2, wherein the one or more metadata blocks are propagated by the host device to one or more host devices located at different regions of the cloud network.

5. The non-transitory computer-readable medium of claim 4, wherein an orchestration mechanism is used in the host device to dynamically configure and propagate each of the one or more metadata blocks associated with the one or more network namespaces.

6. The non-transitory computer-readable medium of claim 1, wherein the host device is a VPN headend device within a cloud datacenter located at an edge of the cloud network.

7. The non-transitory computer-readable medium of claim 1, wherein the termination of the one or more VPN tunnels is achieved by deploying an IPSec service inside each of the one or more network namespaces.

8. The non-transitory computer-readable medium of claim 1, wherein the one or more metadata blocks comprise client enterprise and branch office gateway IP addresses.

9. The non-transitory computer-readable medium of claim 8, wherein the one or more metadata blocks comprise client enterprise and branch office fully qualified domain name.

10. The non-transitory computer readable medium of claim 1, wherein the one or more metadata blocks are implemented by an authentication mechanism.

11. The non-transitory computer readable medium of claim 1, wherein the providing of specific upstream cloud services comprises deploying an upstream connectivity service endpoint for each network namespace of the one or more network namespaces and making the upstream connectivity service discoverable to upstream services.

12. A method comprising:
associating metadata corresponding to one or more data traffic flows with one or more network namespaces configured on a host device within a cloud network, such that the one or more data traffic flows are identifiable by the metadata associated with the one or more network namespaces, the one or more data traffic flows being transported through a corresponding one of one or more VPN tunnels;

terminating each one of the one or more VPN tunnels at a corresponding one of the one or more network namespace, and directing a corresponding one of the one or more data traffic flows through the corresponding one of the one or more network namespaces;

making the one or more data traffic flows discoverable to upstream cloud services based on an identification based on the metadata corresponding to the one or more data traffic flows and associated with the one or more network namespaces; and identifying one or more policies to be applied by the upstream cloud services to the one or more data traffic flows, the one or more policies being associated with the one or more network namespaces.

13. The method of claim 12, wherein the one or more network namespaces are dynamically configured by the host device subsequent to the metadata being made available to the host device.

14. The method of claim 13, wherein the metadata is made available to the host device by one or more cloud based entities configured to communicate with the host device.

15. The method of claim 14, wherein the metadata is further propagated by the host device to one or more host devices located at different regions of the cloud network.

16. The method of claim 15, wherein an orchestration mechanism is used in the host device to dynamically configure and propagate the metadata associated with the one or more network namespaces.

17. The method of claim 12, wherein the host device is a VPN headend device within a cloud datacenter located at an edge of the cloud network.

18. The method of claim 12, wherein the termination of each one of the one or more VPN tunnels is achieved by deploying an IPSec service inside each of the one or more network namespaces.

19. The method of claim 18, wherein the IPsec service is provided by an IPsec server.

20. The method of claim 12, wherein the metadata comprises client enterprise and branch office gateway IP addresses.

21. The method of claim 12, wherein the metadata comprises client enterprise and branch office fully qualified domain name.

22. The method of claim 19, wherein the metadata is implemented by an authentication mechanism.

* * * * *